United States Patent [19]

Delap

[11] 3,951,863

[45] Apr. 20, 1976

[54] SILICA XEROGEL PRODUCTION

[75] Inventor: Joseph A. Delap, Bartlesville, Okla.

[73] Assignee: Phillips Petroleum Company, Bartlesville, Okla.

[22] Filed: Feb. 25, 1974

[21] Appl. No.: 445,583

[52] U.S. Cl. ............................... 252/454; 252/451; 252/458; 423/335
[51] Int. Cl.$^2$ .................... B01J 29/00; B01J 21/08; C01B 33/12
[58] Field of Search ............ 252/451–453, 458, 454; 423/338, 339, 335

[56] References Cited
UNITED STATES PATENTS

| | | | |
|---|---|---|---|
| 1,413,457 | 4/1922 | Collins | 252/451 |
| 2,967,833 | 1/1961 | Kimberlin, Jr. | 252/451 X |
| 3,622,521 | 11/1971 | Hogan et al. | 252/458 X |

Primary Examiner—Carl F. Dees

[57] ABSTRACT

A method of converting a hydrogel to a xerogel by passing a hydrogel and an organic liquid in which water is soluble in countercurrent contact to remove the water from the hydrogel. The solution of organic liquid and water which is formed is allowed to separate into two phases and the organic liquid is recycled back into contact with the hydrogel.

7 Claims, 1 Drawing Figure

U.S. Patent  April 20, 1976  3,951,863
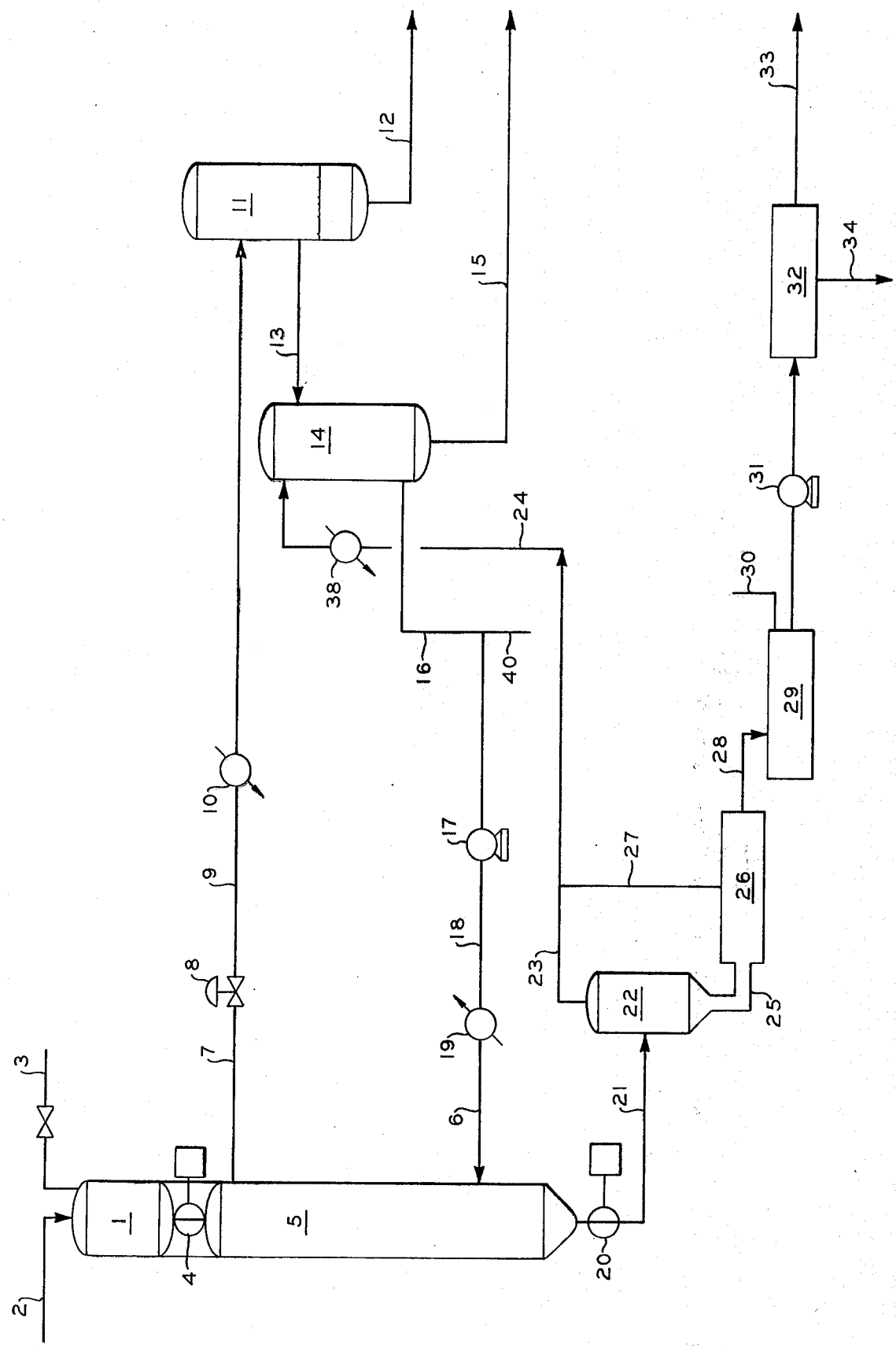

SILICA XEROGEL PRODUCTION

This invention pertains to the production of silica xerogels. In one of its more specific aspects, this invention pertains to the continuous liquid-phase drying of silica hydrogels to produce large pore silica xerogels.

The production of silica xerogels is well known as is their use as substrates for catalyst supports. Generally, an alkali metal silicate, for example, sodium silicate, is reacted with a mineral acid, for example, sulfuric acid, to produce silica in the form of a hydrogel. Water is removed from the hydrogel and a silica xerogel is recovered as the product.

The present invention relates to a method of removing the water from the hydrogel to form the xerogel and to the subsequent steps of drying the xerogel, grinding it and recovering the desired size silica xerogel.

According to the method of this invention a silica hydrogel is passed countercurrently to a normally liquid, oxygen-containing, organic compound in which water is soluble, at elevated temperatures within an extraction zone. The organic compound forms a solution with the water and the solution is removed from the extraction zone. The solution is cooled and introduced into a phase separator wherein the organic compound is separated from the water. From the phase separator, the organic compound is recycled through a heater in which its temperature is elevated and thence into the extraction zone.

The silica gel, from which the principal portion of the water has been separated, and which contains some organic compound and water, is passed into a zone in which most of the residual organic compound and water are flashed from the silica gel to produce a substantially water-free silica gel. The silica is then transferred to a drier in which traces of water and a substantial amount of the remainder of the organic compound are vaporized from the silica. The resulting xerogel can then be transferred to a grinder to reduce the silica xerogel to the desired size.

The method of the present invention applies to any substrate produced in the form of a hydrogel from which water is removed prior to employment of the substrate as a xerogel.

Preferably, it is applicable to the preparation of silicas employable as substrates for catalyst compositions. One of the best known of these is silica employed as substrate for olefin polymerization catalysts.

Similarly, the method of this invention is applicable to such hydrogels regardless of how produced. Usually these are produced by introducing an alkali metal silicate into an acid, or by introducing the acid into the alkali metal silicate to form a hydrogel. The hydrogel is formed at a pH within the range of from about 3 to about 9 at an $SiO_2$ content within the range of from about 3 to about 12 weight percent, the hydrogel being formed at temperatures within the range of from about 33°F. to about 110°F. Aging can be carried out for periods greater than one hour at temperatures within the range of from about 65°F. to about 200°F. Following aging, the hydrogel can be washed to reduce the alkali metal content to a value less than about 0.05 weight percent.

The method of this invention is also applicable to hydrogels in which one or more catalytically active components, for example, compounds of chromium, titanium, zirconium and the like, are introduced into the hydrogel at some stage prior to its being converted to a xerogel.

The method of this invention employs a normally liquid, oxygen-containing organic compound which is soluble in water but preferably, whose solubility in water, or vice versa, is greatly reduced upon a reduction in temperature. Suitable compounds include ethyl acetate, methyl isobutyl ketone, sec-butyl alcohol, n-propyl alcohol, butylraldehyde, diisobutyl ether, isopropyl acetate and the like.

The substrates produced by the method of this invention can be employed in any conventional manner, for example, as support in an olefin polymerization catalyst. For example, the substrate can be impregnated with suitable chromium-containing compounds after which they are activated at any suitable temperature, for example, at a temperature in the range of about 450°F. to about 1600°F. to produce a catalyst active in olefin polymerization.

The method of this invention will be more easily understood if explained in conjunction with the attached FIGURE which illustrates the invention schematically. It will be explained employing certain specific terminology without intending to limit the invention thereto in view of the foregoing generalizations.

In this respect, in the following explanation, the term xerogel is used, in some instances, as applying to that gel from which not all the water has been removed. For purposes of clarification, the term "xerogel" will be used to denote that gel resulting from the removal of any significant portion of water from the original "hydrogel."

Referring now to the FIGURE, hydrogen enters hydrogel feed tank 1 through conduit 2. From the feed tank, the hydrogel is pressurized by means of an inert gas pressure, for example, nitrogen, introduced through conduit 3, through motorized valve 4 into extraction tower 5. The organic liquid, for example, ethyl acetate, is introduced near the bottom of the extraction tower through conduit 6.

Generally, the extraction tower will be maintained at a temperature within the range of from about 180°F. to about 280°F. with the pressure being sufficient to maintain the organic liquid substantially in the liquid state. The organic liquid should be introduced proximate the bottom of the tower in order to provide maximum contact between the organic liquid and the hydrogel. The hydrogel will be introduced into the extraction tower and xerogel withdrawn therefrom at such a rate that the gel will occupy substantially the entire volume of the tower; that is, the gel will assume the position of a bed within the tower with the gel gradually moving down through the tower as its water content is reduced until xerogel is withdrawn from the lower portion of the tower, the hydrogel being introduced into the zone at substantially the same rate that the xerogel, saturated with organic liquid, is withdrawn therefrom. The organic liquid passes up through the bed. In this manner, the extraction tower is operated substantially full of the gel, except for that volume occupied by the organic liquid.

The organic liquid is circulated into the extraction tower at a rate between about 75 to about 250 pounds per hour per pound of hydrogel introduced into the tower. Under these conditions, depending upon the nature of the organic liquid, the gel will have a residence time within the tower of from about 2 to about 5 hours.

The organic liquid-water solution is taken overhead from the extraction tower through conduit 7 in which is located pressure control valve 8 which regulates the pressure on the tower. The organic liquid-water solution is transferred through conduit 9 and passed through cooler 10.

Cooler 10 can be any conventional cooler which reduces the temperature of the organic liquid-water solution to a temperature at which a principal portion of the water separates from the organic liquid in phase separator 11. This temperature will depend upon the nature of the organic liquid but should, in the case of ethyl acetate, be such that the water content of the recovered organic liquid introduced into the extraction zone is within the range of from about 2 to about 5 weight percent. Accordingly, in that instance in which the organic liquid is ethyl acetate, the temperature in the separator should be maintained within the range of from about 50° to about 100°F. When employing other organic compounds, the temperature of the organic liquid is advantageously reduced as low as feasible to minimize the amount of dissolved water remaining in the organic liquid.

A principal portion of the water containing minor amounts of the organic liquid can be withdrawn to disposal from the phase separator through conduit 12. A principal portion of the organic liquid containing minor amounts of water is withdrawn from the phase separator through conduit 13 into accumulator 14. Additional water can be separated from the organic liquid in the accumulator and withdrawn through conduit 15 to disposal.

From the lower portion of the accumulator, pump 17 is used to transfer the organic liquid containing residual water from accumulator 14 via conduit 16 through conduit 18 into exchanger 19 wherein the organic liquid is heated to an elevated temperature comparable to that within the extraction tower into which it is introduced through conduit 6.

Make-up organic liquid is introduced into the system through conduit 40.

From the lower portion of the extraction tower, treated gel containing water and some organic liquid is withdrawn through valve 20 and introduced through conduit 21 into separation zone 22 which can be a flash chamber.

Valve 4 at the inlet to the extraction tower and valve 20 at the outlet of the tower can be syncronized such that they operate simultaneously on a preestablished time cycle in such a manner that as substantially dry gel plug organic liquid is allowed to pass through valve 20, approximately the same amount of hydrogel is admitted through valve 4.

In flash chamber 22, the pressure on the gel will be reduced to about atmospheric while the temperature of the gel will be maintained at least at the boiling point of the organic liquid. As a result, much of the organic liquid and some residual water are flashed from the gel and passed from the drum through conduits 23 and into conduit 24, cooled in cooler-condenser 38 and introduced into accumulator 14.

On about the same time cycle as that for valve 20, the flashed gel is passed from the flash chamber through conduit 25 into drier 26 which can be conventional within the art, preferably being a rotary drier.

Organic liquid vapors and remaining water vapors pass from the rotary drier, which can be maintained at a temperature within the range of from about 300° to 350°F., through conduit 27 and enter conduit 24. The combined vapors in conduit 24 pass through cooler-condenser 38 and into accumulator 14. The dried xerogel can then be transferred through conduit 28 into conveyor drier 29 wherein the xerogel can be additionally devolatilized at temperatures up to about 600°F., additional vapors being removed through conduit 30. The treated xerogel, in the case of olefin polymerization, can then be impregnated with an organic chromium-containing compound, a portion of the chromium being convertible to the hexavalent state at an elevated temperature, for example, in the range of about 450°F. to about 1600°F. activation temperature, passed through grinder 31 and into screen 32 wherein size separation can be made with silica or catalyst of the desired size being recovered through conduit 33 with over- and under-size particles being disposed of through conduit 34.

The best mode of practicing the invention is illustrated by the following theortetical example in which 80 pounds per hour of hydrogel are introduced into a 10-inch diameter tower having a height of 12 feet. The hydrogel contains about 87.5 weight percent water. Ethyl acetate is employed as the organic liquid at a circulation rate of 957 pounds per hour. The extraction tower is maintained at 250°F. and 100 psig.

About 937 pounds per hour at ethyl acetate and about 70 pounds of water per hour are taken overhead from the extraction tower, cooled to 60°F. and introduced into the phase separator. Upon separation of the water and the ethyl acetate, about 70 pounds of water and about 10 pounds per hour of ethyl acetate are routed to disposal or to recovery of the organic compound.

About 30 pounds of gel per hour containing about 20 pounds of ethyl acetate are removed from the lower portion of the extraction tower and introduced into a flash chamber having a diameter of 12 inches and a length of about 4 feet. The flash chamber is maintained at a temperature of about 170°F. and a pressure of about atmospheric. About 10 pounds per hour of ethyl acetate are flashed from the flash chamber, cooled to about 80°F. and introduced into the accumulator and combined with that ethyl acetate from the phase separator, the combined stream being recycled to the extraction tower.

Gel from the flash chamber comprised of about 10 pounds of gel and 10 pounds of ethyl acetate is introduced into a conventional rotary drier operating at about 350°F. About 8 pounds of ethyl acetate vapors are routed to the accumulator with the substantially dry gel being introduced into the conveyor drier.

The conveyor drier operates at a temperature of about 600°F. About 2 pounds per hour residual ethyl acetate are routed from the drier to a flare or to a recovery zone with about 10 pounds of xerogel being passed into a grinder, the particulated xerogel then being screened and xerogel of the desired mesh size being recovered. In the theoretical example here concerned, that silica gel having a mesh size of between about 50 to 200 mesh and amounting to about 9.5 pounds is retained.

It will be evident from the foregoing that various modifications can be made to the method of this invention. However, such are considered to be within the scope of the invention.

What is claimed is:

1. A method for removing water from a silica-containing hydrogel which comprises:
   a. passing a silica-containing hydrogel and a liquid, oxygen-containing organic compound in which water is soluble in countercurrent contact in a first zone at a first pressure to remove water from said hydrogel and to form a gel containing a residual quantity of water and a residual quantity of organic compound and to form an organic compound-water solution;
   b. passing said gel into a separation zone at a second pressure less than said first pressure to separate at least a portion of said residual quantity of organic compound from said gel and to form a xerogel;
   c. cooling said organic compound-water solution to separate said organic compound from said water;
   d. combining the separated residual quantity of organic compound from step (b) with the organic compound separated in step (c) to form a combined organic compound;
   e. heating said combined organic compound and introducing the heated organic compound into said countercurrent contact; and,
   f. recovering a xerogel.

2. The method of claim 1 in which said xerogel is devolatilized and particulated.

3. The method of claim 1 in which said hydrogel contains a catalytically-active component.

4. The method of claim 1 in which said oxygen-containing organic compound is ethyl acetate and has a water content within the range of from about 2 to about 5 weight percent.

5. The method of claim 1 in which said organic liquid is introduced into contact with said hydrogel at a rate within the range of from about 75 to about 250 pounds per hour of said hyrogel.

6. The method of claim 3 in which said hydrogel contains a material selected from the group consisting of compounds of chromium, titanium and zirconium.

7. The method of claim 1 wherein said silica-containing hydrogel is passed into said first zone and said gel containing a residual quantity of water and a residual quantity of organic compound is passed from said first zone into a separation zone at a rate coordinated to maintain said first zone substantially full of gel.

* * * * *